Figure 1:
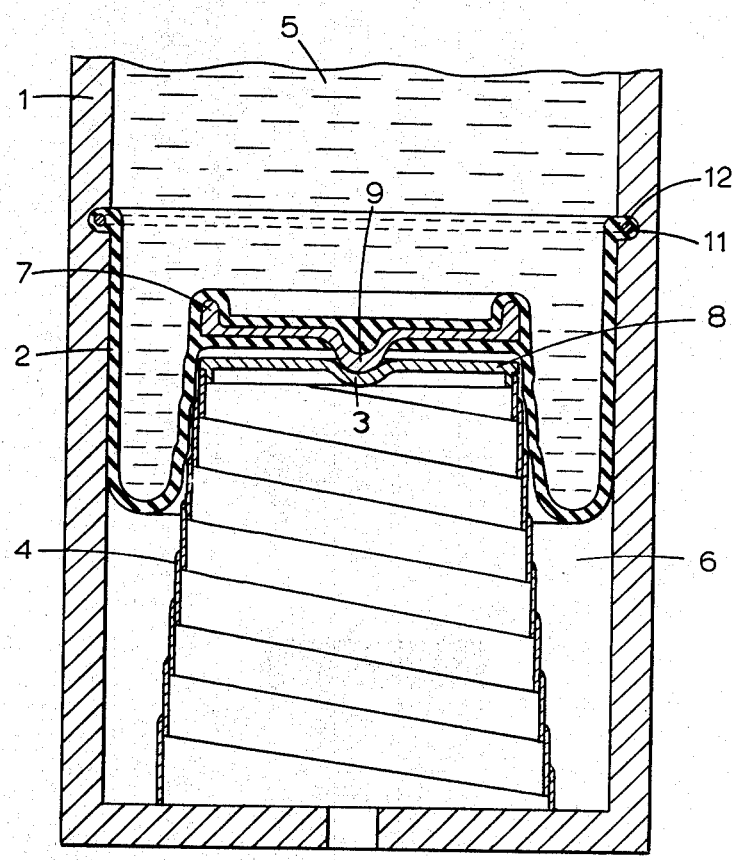

Dec. 21, 1965    H. P. DOETSCH    3,224,345
DIAPHRAGM SUPPORT
Filed July 10, 1963    2 Sheets-Sheet 1

INVENTOR
HANS PETER DOETSCH
By Shoemaker and Mattare
ATTYS.

Dec. 21, 1965     H. P. DOETSCH     3,224,345
DIAPHRAGM SUPPORT
Filed July 10, 1963     2 Sheets-Sheet 2

INVENTOR
HANS PETER DOETSCH
By Shoemaker and Mattare
ATTYS

United States Patent Office 3,224,345
Patented Dec. 21, 1965

3,224,345
DIAPHRAGM SUPPORT
Hans Peter Doetsch, 32 Altdrossenfeld,
uber Bayreuth, Germany
Filed July 10, 1963, Ser. No. 293,999
Claims priority, application Germany, July 16, 1962,
D 39,384
4 Claims. (Cl. 92—94)

The invention concerns a support for "rolling" diaphragms which are used for separating two media and as a dividing wall which is displaceable within certain limits. Such diaphragms have an area considerably greater than the cross-section of the passage which they obstruct and are supported at their centre. Since the diaphragm periphery is fixed to the wall of the passage, its outer portion forms a continuous annular fold, the depth of the fold varying as the central support is moved along the passage, and the diaphragm rolls along the wall of the passage.

A supporting piston, sometimes with a helical spring, has hitherto been used for supporting the central portion of the diaphragm but these constructions take up a large amount of space. The use of helical springs brings the additional disadvantage that the spring may be bent sideways, particularly if the diaphragm has a long stroke.

According to the invention, there is provided a support for a rolling diaphragm, which comprises a frustoconical spring formed from a flat strip of resilient material. The width of the strip preferably decreases from the smaller diameter to the larger diameter of the spring, so that the relative movement between the turns of the spring and the diaphragm is kept as small as possible at the points of contact.

Further according to a preferred feature of the invention a spring plate is mounted at the end of the spring nearest the diaphragm and has a central recess providing a bearing for a supporting cap. The cap may advantageously be worked into the material of the diaphragm, so that only a central part-spherical boss protrudes from the material and is supported in the recess in the spring plate.

It is desirable for the spring to be supported at the end with the larger diameter in such a way that this diameter cannot be increased when the spring is compressed. This may, for example, be done by providing the supporting surface with a cylindrical recess the size of the external diameter of the end of the unstressed spring. Instead of rotatably mounting the diaphragm on the spring plate, it is possible to provide the end of the spring remote from the diaphragm with a spring plate, the bent edge of which engages without clearance about the end of the spring, a roller or ball bearing being mounted between the spring plate and the associated supporting surface.

With the arrangement according to the invention a reliable guide is provided for the diaphragm with a minimum of bulk, and damage caused by the support can be reduced.

Figure 2:
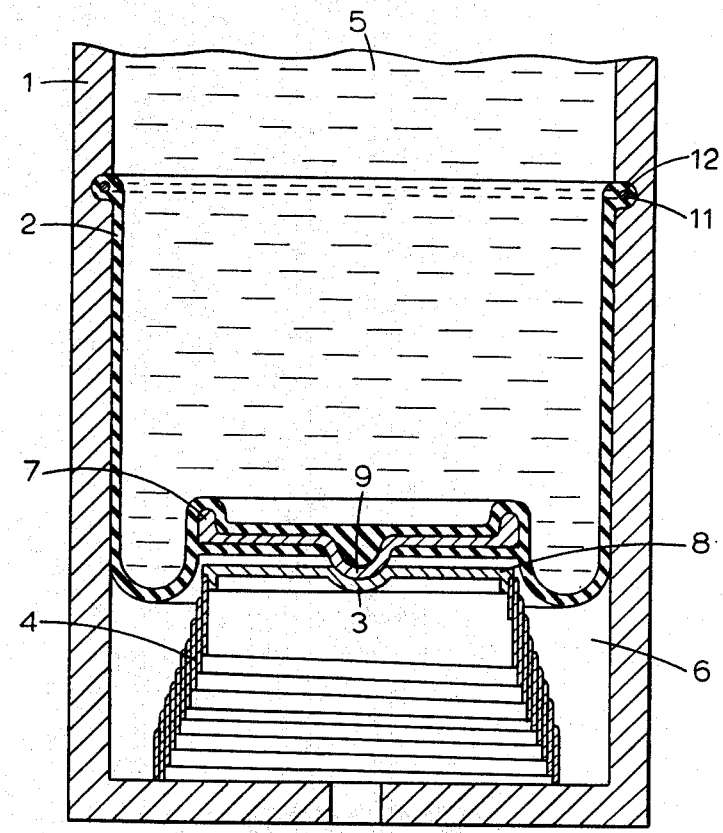
Figure 3:
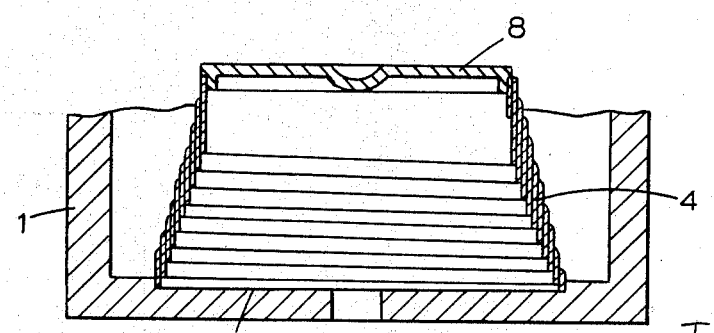

FIGS. 1 and 2 of the accompanying drawing show an example of a diaphragm assembly according to the invention in two different positions and FIG. 3 shows a modified spring.

The diaphragm 2 of natural or synthetic rubber e.g. P.V.C. or polyethylene is fixed to the side walls of the housing 1 by means of an embedded ring 11 engaging in a recess 12 and separates for example, an oil filling 5 from a gas filling 6. The diaphragm is supported by the frustoconical spring 4, which is supported at its wider end on the base of the housing 1 and has a spring plate 8 with a central recess 3 mounted on its narrower end. The spring 4 is constituted by a flat strip of spring steel, the width of the strip decreasing from the smaller diameter of the spring to the larger diameter of the spring. A supporting cap 7 is embedded in the diaphragm 2 with a part-spherical boss 9 extending therefrom. The boss 9 is rotatably mounted in the recess 3 thereby preventing the rotary movement executed by the top of the spring when the spring is compressed, from being transferred to the diaphragm.

Abrasion of the diaphragm on the side surfaces of the spring can be diminished by polishing the spring, rounding off its corners and biassing the telescoped coils towards one another so that there are no gaps between adjacent turns.

The spring shown in FIG. 3 is formed from a flat strip of spring steel which decreases in width from the smallest diameter of the spring to the largest diameter of the spring. The last turn at each end of the spring is, of course, trimmed to provide a flat end. FIG. 3 also shows the location of the lower end of the spring in a cylindrical recess 10 so that its diameter cannot increase during compression.

I claim:
1. A diaphragm assembly for installation in a housing, said assembly comprising a fluid impervious flexible diaphragm in the form of an elongate sleeve having an open end and a closed end, the open end being adapted to be secured peripherally in and to the wall of the housing to partition the housing into two chambers, a frustoconical spring comprising a plurality of turns, formed from a flat strip of resilient material and disposed at one side of and coaxial with the said sleeve, the flat surfaces of the strip being substantially parallel to the axis of said spring, each turn being in sliding engagement with adjacent turns, the apical end of the frustoconical spring opposing the said closed end of the sleeve, bearing means comprising two members, one comprising a plate with a recess therein secured to said apical end of the spring and the other comprising a plate with a boss projecting therefrom secured to said opposed end of the sleeve, said bearing means providing rotational movement between said apical end of the spring and said opposed end of the diaphragm while preventing relative radial displacement thereof, and said sleeve length being such as to form a deep rolling loop outwardly of the spring when the spring is in an extended position.

2. The invention according to claim 1, wherein the plate carried on the diaphragm sleeve is embedded in the flexible material of the sleeve and the said boss forms a rounded portion of the sleeve carried plate and projects through the said flexible material.

3. The invention according to claim 1, wherein the plate carried by the spring is a disk peripherally secured in the apical end turn of the spring and the said boss engaging in said recess maintains a clearance space around the recess between the spring carried plate and the opposed end of the diaphragm sleeve.

4. A diaphragm assembly comprising an elongate housing having a closed bottom wall, a flexible fluid impervious diaphragm in the form of an elongate sleeve, said diaphragm sleeve having an open end and a closed end, means integral with and encircling said open end conforming to the interior contour of the housing and fixed thereto in sealing relationship to divide the same into two elongate chambers, a frustoconical spring in one chamber adapted to support the center portion of the closed end of the diaphragm sleeve, said frustoconical spring comprising a plurality of turns each of which is at least partially telescoped with respect to the adjacent turns, said spring being formed from a flat strip of resilient material, the flat surfaces of said strip being substantially parallel to the axis of said spring, each turn being radially biased against an adjacent turn, the apical end of said spring opposing the said closed end of the sleeve and being related thereto for axial movement therewith and against relative radial movement with respect thereto, the other end of said spring opposing the bottom wall of said housing, a bearing connection means connected to one end of said spring enabling the portion of the spring adjacent said bearing connection means to rotate on change of the axial dimensions of said spring without imparting torque to said diaphragm sleeve.

References Cited by the Examiner

UNITED STATES PATENTS

| | | | |
|---|---|---|---|
| 21,255 | 8/1858 | Harrison | 267—62 |
| 1,469,424 | 10/1923 | McQuaid et al. | 267—54 |
| 2,089,491 | 8/1937 | Kuiper | 151—5 |
| 2,132,952 | 10/1938 | Hewitt | 220—85 |
| 2,333,107 | 11/1943 | Knox | 267—20 |
| 2,506,362 | 5/1950 | Hofman | 220—46 |
| 2,597,650 | 5/1952 | Maehren | 261—1 |
| 2,604,118 | 7/1952 | Greer | 138—30 |
| 2,741,476 | 4/1956 | Burney | 267—62 |
| 2,804,884 | 9/1957 | Knox | 138—30 |
| 3,018,970 | 1/1962 | Wittenberg et al. | 220—85 |
| 3,082,792 | 3/1963 | Jenkins | 92—94 |
| 3,126,879 | 3/1964 | Canfield | 92—98 |

FOREIGN PATENTS

| | | |
|---|---|---|
| 473,927 | 2/1915 | France. |
| 1,038,842 | 9/1958 | Germany. |

THERON E. CONDON, *Primary Examiner.*